(12) United States Patent
Sano

(10) Patent No.: US 11,824,392 B2
(45) Date of Patent: Nov. 21, 2023

(54) BATTERY PACK

(71) Applicant: Murata Manufacturing Co., Ltd., Nagaokakyo (JP)

(72) Inventor: Kosuke Sano, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 274 days.

(21) Appl. No.: 16/941,789

(22) Filed: Jul. 29, 2020

(65) Prior Publication Data
US 2020/0358297 A1 Nov. 12, 2020

Related U.S. Application Data

(63) Continuation of application No. PCT/JP2019/006524, filed on Feb. 21, 2019.

(30) Foreign Application Priority Data

Mar. 1, 2018 (JP) ................................. 2018-036730

(51) Int. Cl.
*H02J 7/00* (2006.01)
*H01M 4/58* (2010.01)
(Continued)

(52) U.S. Cl.
CPC .............. *H02J 7/007* (2013.01); *H01M 4/58* (2013.01); *H01M 10/0525* (2013.01);
(Continued)

(58) Field of Classification Search
CPC ...... H02J 7/00; H02J 7/007; H02J 7/02; H02J 7/00302; H02J 7/0031; H02J 7/0016;
(Continued)

(56) References Cited

U.S. PATENT DOCUMENTS 5,998,967 A * 12/1999 Umeki .................. H02J 7/0016
320/122
8,219,333 B2 * 7/2012 Li .......................... H02J 7/0048
702/63
(Continued)

FOREIGN PATENT DOCUMENTS

CA 2585064 A1 * 5/2006 ............ H02J 7/0016
CA 2628431 C * 5/2014 .............. A61M 5/44
(Continued)

OTHER PUBLICATIONS

Huang, Battery Equalization Circuit, Translation of CN 207732042U, Aug. 14, 2018 (Year: 2018).*
(Continued)

*Primary Examiner* — M Baye Diao
(74) *Attorney, Agent, or Firm* — ArentFox Schiff LLP

(57) ABSTRACT

A battery pack is provided that includes a plurality of battery cells, a detection portion, a plurality of discharge circuits, and a controller. The plurality of battery cells are connected in series with each other. The detection portion detects a cell voltage between both ends of each battery cell. The plurality of discharge circuits respectively discharge the battery cells. The controller controls the discharge circuits based on the cell voltage detected by the detection portion. The controller controls the discharge circuit to discharge at least one first battery cell when a cell voltage equal to or greater than a first threshold value is detected in the first battery cell and discharge at least one second battery cell when a cell voltage equal to or greater than a second threshold value smaller than the first threshold is detected in the second battery cell other than the first battery cell.

20 Claims, 6 Drawing Sheets

(51) Int. Cl.
*H01M 10/0525* (2010.01)
*H01M 10/44* (2006.01)
*H01M 10/48* (2006.01)
*H02J 7/02* (2016.01)

(52) U.S. Cl.
CPC ......... *H01M 10/441* (2013.01); *H01M 10/48* (2013.01); *H01M 10/482* (2013.01); *H02J 7/02* (2013.01)

(58) Field of Classification Search
CPC .. H01M 10/0525; H01M 10/482; H01M 4/58; H01M 10/441; H01M 10/48; H01M 4/5825; H01M 4/587; H01M 10/425; H01M 2010/4271; Y02E 60/10
USPC ......................................................... 320/118
See application file for complete search history.

(56) References Cited

U.S. PATENT DOCUMENTS

| | | | | |
|---|---|---|---|---|
| 8,878,493 B2* | 11/2014 | Kobayashi | .......... | H01M 10/482 |
| | | | | 320/122 |
| 9,136,716 B2* | 9/2015 | White | .................. | H02J 7/0016 |
| 9,276,422 B2* | 3/2016 | Hotta | .................... | H02J 7/0024 |
| 9,525,289 B2* | 12/2016 | Yoshida | .............. | H01M 10/482 |
| 9,614,383 B2* | 4/2017 | Boggs | ........................ | B60L 3/00 |
| 10,069,311 B2 | 9/2018 | Sugeno et al. | | |
| 10,790,679 B2* | 9/2020 | Motoichi | .................. | H02J 7/04 |
| 11,101,667 B2* | 8/2021 | Shiraishi | ............. | H02J 7/00302 |
| 11,110,817 B2* | 9/2021 | Koda | .................... | H02J 7/0045 |
| 2007/0166617 A1* | 7/2007 | Gozdz | .................. | H01M 4/5825 |
| | | | | 429/231.95 |
| 2009/0009141 A1* | 1/2009 | Li | ........................ | H02J 7/00711 |
| | | | | 320/141 |
| 2012/0032641 A1* | 2/2012 | Yun | ........................ | H02J 7/0016 |
| | | | | 320/118 |
| 2013/0187611 A1* | 7/2013 | Suzuki | ................ | H01M 50/204 |
| | | | | 320/118 |
| 2014/0203782 A1* | 7/2014 | Xue | ....................... | H02J 7/0014 |
| | | | | 320/134 |
| 2016/0218528 A1 | 1/2016 | Sugeno et al. | | |

FOREIGN PATENT DOCUMENTS

| | | | | |
|---|---|---|---|---|
| CN | 101777784 A | * | 7/2010 | ............ H02J 7/0014 |
| CN | 101924350 A | * | 12/2010 | |
| CN | 105322611 A | * | 2/2016 | ............ H02J 7/0019 |
| CN | 207732042 U | * | 8/2018 | ........ H01M 10/4207 |
| DE | 112011104434 T5 | * | 9/2013 | .......... H01M 10/482 |
| JP | 2013121303 A | | 6/2013 | |
| JP | 2013146160 A | | 7/2013 | |
| JP | 2015061335 A | | 3/2015 | |
| JP | 5705046 B2 | * | 4/2015 | |
| JP | 2017085860 A | * | 5/2017 | ................ H02J 7/02 |
| TW | I379488 B | * | 12/2012 | ................ H02J 7/00 |
| WO | WO-2019069971 A1 | * | 4/2019 | ............ H01M 10/44 |

OTHER PUBLICATIONS

English Translation of CN101777784A "Equalizing charge device and equalizing charge method", pp. 1-4 (Year: 2010).*
International Search Report Issued for PCT/JP2019/006524, dated Apr. 16, 2019.
Written Opinion of the International Searching Authority issued for PCT/JP2019/006524, dated Apr. 16, 2019.

* cited by examiner

BATTERY PACK

CROSS REFERENCE TO RELATED APPLICATION

The present application is a continuation of PCT/JP2019/006524 filed Feb. 21, 2019, which claims priority to Japanese Patent Application No. 2018-036730, filed Mar. 1, 2018, the entire contents of each of which are incorporated herein by reference.

TECHNICAL FIELD

The present invention relates to a battery pack including a plurality of rechargeable battery cells.

BACKGROUND

A technique for equalizing the voltage of each battery cell from the viewpoint of safety and time reduction of charging and the like when a battery pack with a plurality of battery cells is charged is known (for example, Patent Document 1, identified below).

Patent Document 1 discloses a power storage device whose charge is managed by a control device. The power storage device of Patent Document 1 includes a plurality of power storage portions connected in series, a cell balance portion connected in parallel to each of the power storage portions with a switch interposed therebetween, and a control portion that communicates with a higher-level control device to control charging current. Patent Document 1 is intended to complete charging of the power storage portion of each power storage portion in a short time under control by the control portion of the power storage device.

Patent Document 1: Japanese Patent Application Laid-Open No. 2015-61335.

Patent Document 1 does not particularly consider when the power storage device is charged in a situation where there is an abnormality such as a failure of the higher-level control device. That is, the safety of the battery pack when charging is performed from a higher-level system that can have an abnormality is not considered.

SUMMARY OF THE INVENTION

Accordingly, it is an object of the present invention to provide a rechargeable battery pack with improved safety during charging.

Thus, a rechargeable battery pack is provided that includes a plurality of battery cells, a detection portion, a plurality of discharge circuits, and a controller. The plurality of battery cells are connected in series with each other. The detection portion detects a cell voltage between both ends of each battery cell. The plurality of discharge circuits respectively discharge the battery cells. The controller controls the discharge circuits based on the cell voltage detected by the detection portion. Moreover, the controller controls the discharge circuit to discharge at least one first battery cell when a cell voltage equal to or greater than a predetermined first threshold value is detected in the first battery cell of the plurality of battery cells and discharge at least one second battery cell when a cell voltage equal to or greater than a second threshold value smaller than the first threshold is detected in the second battery cell other than the first battery cell of the plurality of battery cells.

The battery pack of the exemplary embodiment is a rechargeable battery pack with improved safety at the time of charging.

DETAILED DESCRIPTION

Hereinafter, exemplary embodiments of a battery pack according to the present disclosure will be described with reference to the accompanying drawings.

Each exemplary embodiment is illustrative, and it is noted that the configurations shown in the different embodiments can be partially replaced or combined. In a second exemplary embodiment and subsequent embodiments, description of items common to the first embodiment will be omitted, and only different points will be described. In particular, the same operation and effect of the same configuration will not be sequentially described for each embodiment.

First Exemplary Embodiment

In a first exemplary embodiment, a battery pack is provided that is configured to perform a balance operation during charging. The balance operation refers to an operation of discharging at least one battery cell using a discharge circuit for each battery cell in the battery pack. Hereinafter, a state in which the voltages of a plurality of battery cells are equalized as a target of the balance operation is referred to as a balance state.

A conventional battery pack performs the balance operation so that voltages between all battery cells connected in series are brought into a uniform balance state. In the conventional balance operation, it is assumed that, when an abnormal voltage exceeding a specified voltage is applied to a battery pack, due to a failure of a higher-level system that charges and monitors the battery pack, a large number of, e.g., all or a majority of, battery cells are simultaneously overcharged. In such a situation, there is a concern that heat generation, expansion, and the like can occur at the same time in the large number of battery cells, and problems with stability, safety, and the like are considered in the conventional battery pack.

Therefore, the battery pack according to the present embodiment avoids the above situation and improves the safety during charging by the balance operation using the balance state in which some battery cells (e.g., referred to as one or more first battery cells) have a predetermined amount of difference from the large number of other battery cells (e.g., referred to as one or more second battery cells). Hereinafter, the configuration and operation of the battery pack according to the present embodiment will be described with reference to FIGS. 1 to 6.

Configuration

Figure 1:
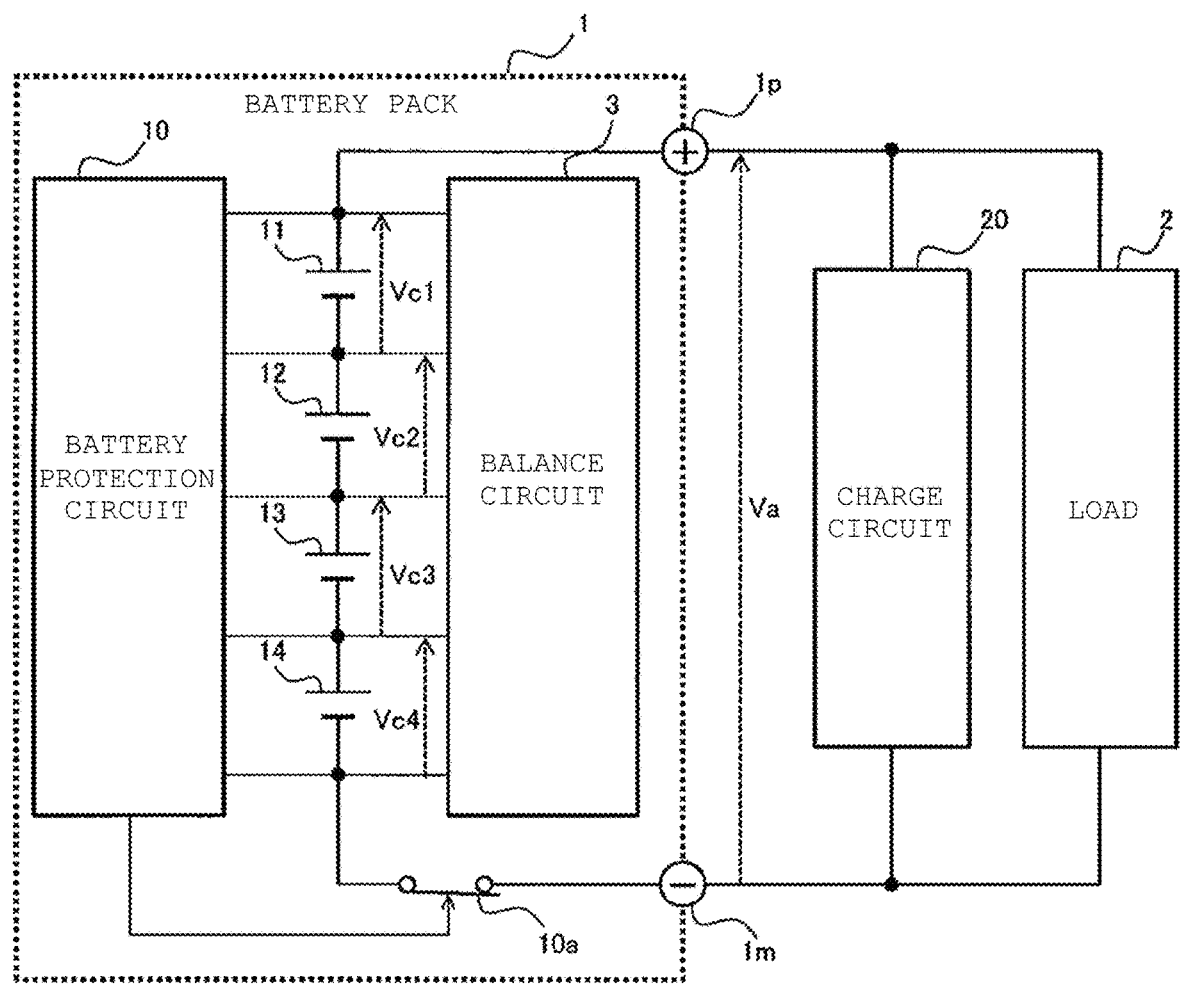
FIG. 1 is a diagram for explaining an example of use of a battery pack according to a first exemplary embodiment.

The configuration of the battery pack according to first exemplary embodiment will be described with reference to FIGS. 1 and 2. FIG. 1 is a diagram for explaining an example of use of a battery pack 1 according to the present embodiment.

In general, the battery pack 1 provides a power storage device that stores power that can be supplied to various electronic devices (for example, on-vehicle devices and mobile devices). In the example of use in FIG. 1, the battery pack 1 is connected to a load 2 and a charge circuit 20 with a positive terminal 1p and a negative terminal 1m interposed therebetween. The battery pack 1 supplies a battery pack voltage Va between the positive terminal 1p and the negative terminal 1m to various loads 2. Moreover, the battery pack 1 is a secondary battery, and can be charged by the charge circuit 20 connected between the terminals 1p and 1m.

The charge circuit 20 includes, for example, a generator and a converter, and controls a voltage for charging the battery pack 1. Moreover, the charge circuit 20 includes a detection circuit (e.g., a voltage detector) for detecting the battery pack voltage Va. The charge circuit 20 is configured to execute a charge operation for charging the battery pack 1 when the battery pack voltage Va detected by the detection circuit is less than a predetermined value, and stops the charge operation for the battery pack 1 when the battery pack voltage Va detected is equal to or greater than the predetermined value. The predetermined value is, for example, a voltage value indicating the full charge state of the battery pack 1 (for example, 14.5 V).

The battery pack 1 includes a plurality of battery cells 11 to 14, a battery protection circuit 10, and a balance circuit 3, as shown in FIG. 1. In this embodiment, an example in which one first battery cell 11 and three second battery cells 12 to 14 are connected in series in the battery pack 1 will be described. It is noted that the first battery cell 11 may be connected between any of the second battery cells 12 to 14 in alternative aspects.

Each of the battery cells 11 to 14 includes a lithium ion battery, and includes, for example, lithium iron phosphate (LFP) in a positive electrode material and graphite (Gr) in a negative electrode material (hereinafter referred to as "LFP-Gr cell" in some cases). Each of the battery cells 11 to 14 may include one power storage element or may include a plurality of power storage elements. The plurality of power storage elements may be connected to each other in parallel, for example. Moreover, the plurality of power storage elements may be combined as appropriate to form one battery cell.

The individual battery cells 11 to 14 are sealed by, for example, a laminate film. The battery cells 11 to 14 are arranged in a housing (not shown) that accommodates each part of the battery pack 1. The first battery cell 11 may be arranged between the second battery cells 12 to 14 in the housing. Moreover, a cushioning material different from the second battery cells 12 to 14 may be arranged around the first battery cell 11. With the above arrangement, the influence on the deformation of the battery pack 1 when the first battery cell 11 expands or the like is reduced, and the safety of the battery pack 1 can be improved.

The battery protection circuit 10 is a protection circuit incorporated inside the battery pack 1. The battery protection circuit 10 achieves a battery protection function that forcibly terminates the charging of the battery pack 1 when any of the battery cells 11 to 14 is in an abnormal charge state. The battery protection circuit 10 is configured to detect cell voltages Vc1 to Vc4, which are voltages between terminals of the battery cells 11 to 14, respectively, and, when any of the cell voltages exceeds a predetermined threshold value (for example, 4.0 V), the battery protection circuit 10 is configured to control a switch 10a or the like so as to cut off the power supply to the battery cells 11 to 14.

The balance circuit 3 achieves a balance function of executing the balance operation that discharges the battery cells 11 to 14 at the end of charging of the battery pack 1, or the like. In the battery pack 1 according to the present embodiment, the balance operation is performed such that the SOC difference between the first battery cell 11 and the second battery cells 12 to 14 is maintained while the cell voltages Vc2 to Vc4 of the second battery cells 12 to 14 are made uniform. Hereinafter, the configuration of the battery pack 1 according to the present embodiment will be described in detail with reference to FIG. 2.

Figure 2:
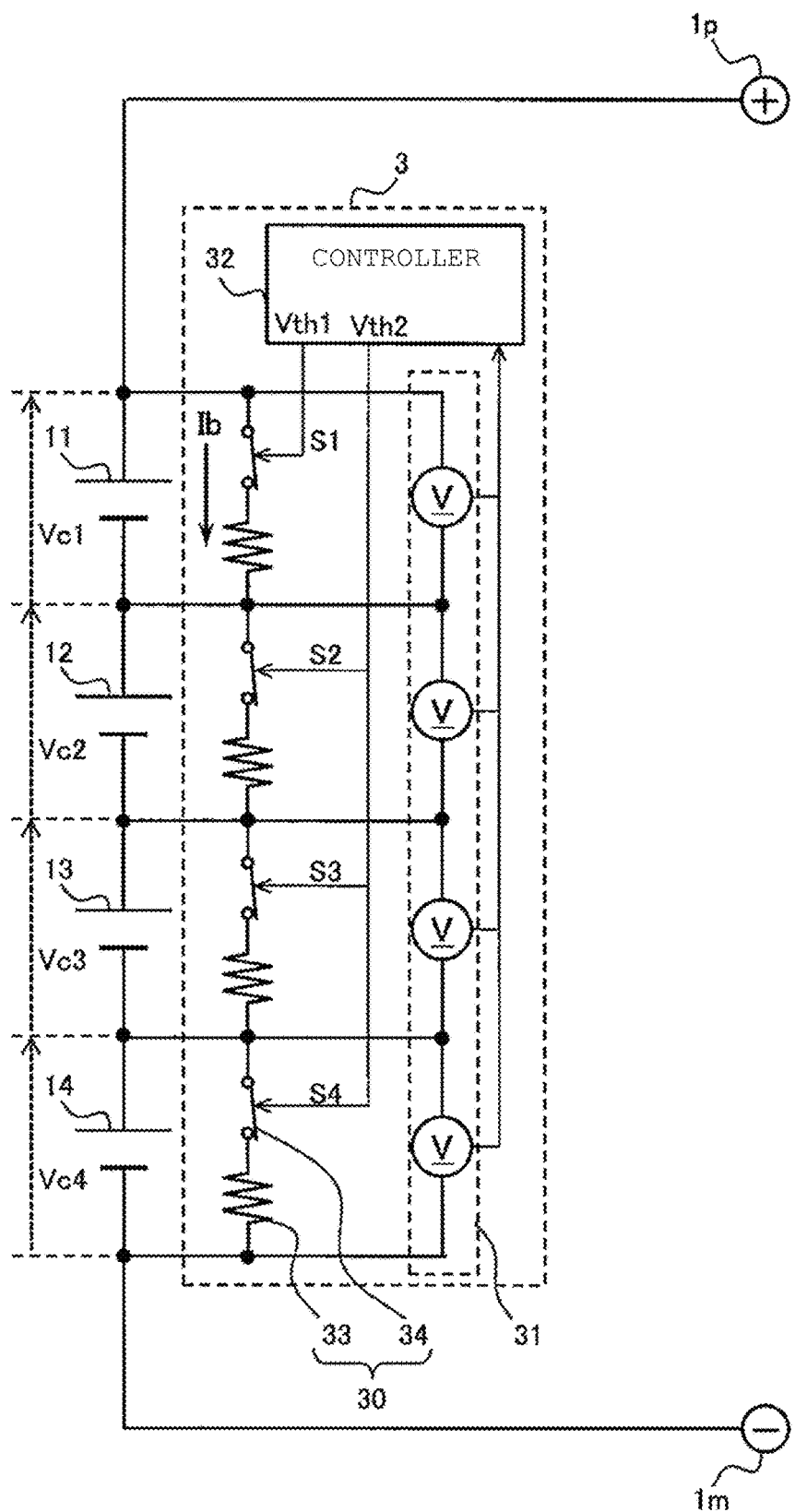
FIG. 2 is a circuit diagram showing a configuration of the battery pack according to the first exemplary embodiment.

FIG. 2 is a circuit diagram showing a configuration of the battery pack 1 according to the first exemplary embodiment. In FIG. 2, illustration of the battery protection circuit 10 (FIG. 1) and the like is omitted.

In the present embodiment, the balance circuit 3 of the battery pack 1 includes four discharge circuits 30 for discharging each of the four battery cells 11 to 14, a detection portion 31 (e.g., voltage detector(s)), and a controller 32. The detection portion 31 and the controller 32 are mounted on, for example, an IC or the like.

The four discharge circuits 30 are connected in parallel to one of the four battery cells 11 to 14, respectively. In the present embodiment, each discharge circuit 30 is configured by a series circuit of a discharge resistance 33 and a switch 34. Each discharge resistance 33 has, for example, a common resistance value R (for example, $100\Omega$). The switch 34 includes, for example, an FET, an IGBT, or the like. When the switch 34 is turned on, the discharge circuits 30 for each of the battery cells 11 to 14 short-circuits the corresponding battery cell with the discharge resistance 33 and discharges the battery cell.

The detection portion 31 includes a voltage measurement circuit and the like, that is configured to detect the cell voltages Vc1 to Vc4 of the four battery cells 11 to 14. The detection portion 31 outputs a detection value indicating a detection result of the cell voltages Vc1 to Vc4 to the controller 32.

According to the exemplary embodiment, the controller 32 includes a logic circuit, a comparator, and the like. The controller 32 is configured to control discharge in the balance operation of the corresponding battery cells 11 to 14 on the basis of the detection values of the cell voltages Vc1 to Vc4. Moreover, the controller 32 performs a comparison determination (e.g., using the comparator) based on a predetermined threshold value with respect to the detection values of the cell voltages Vc1 to Vc4, and performs control to turn on and off the respective switches 34 according to the determination result.

In the present embodiment, the controller 32 includes a first threshold value Vth1 for determining the threshold value of the cell voltage Vc1 of the first battery cell 11, and a second threshold value Vth2 for determining the threshold value the cell voltages Vc2 to Vc4 of the second battery cells 12 to 14. The first threshold value Vth1 is greater than the second threshold value Vth2.

For example, when determining that the detection value of the cell voltage Vc1 of the first battery cell 11 is greater than the first threshold value Vth1, the controller 32 generates a control signal S1 to turn on the switch 34 of the discharge circuit 30 for the first battery cell 11. Moreover, when determining that the detection value of the cell voltage Vc1 is equal to or less than the first threshold value Vth1, the controller 32 generates a control signal S1 to turn off the switch 34.

Moreover, the controller 32, based on comparison results between the detection values of the cell voltages Vc2 to Vc4 of the second battery cells 12 to 14 and the second threshold value Vth2, similar to the above, generates control signals S2 to S4 to turn on and off the switches 34 of the discharge circuits 30 for the second battery cells 12 to 14. For example, when determining that the detection value of the cell voltage Vc2 of the specific second battery cell 12 of the plurality of second battery cells 12 to 14 is greater than the second threshold value Vth2, the control portion 32 generates a corresponding control signal S2 to turn on the switch 34 of the discharge circuit 30 for the second battery cell 12.

The first and second threshold values Vth1 and Vth2 in the balance circuit portion 3 above are set in consideration of the charge voltage characteristics of the battery cells 11 to 14. The charge voltage characteristics of the battery cells 11 to 14 will be described with reference to FIG. 3.

Figure 3:
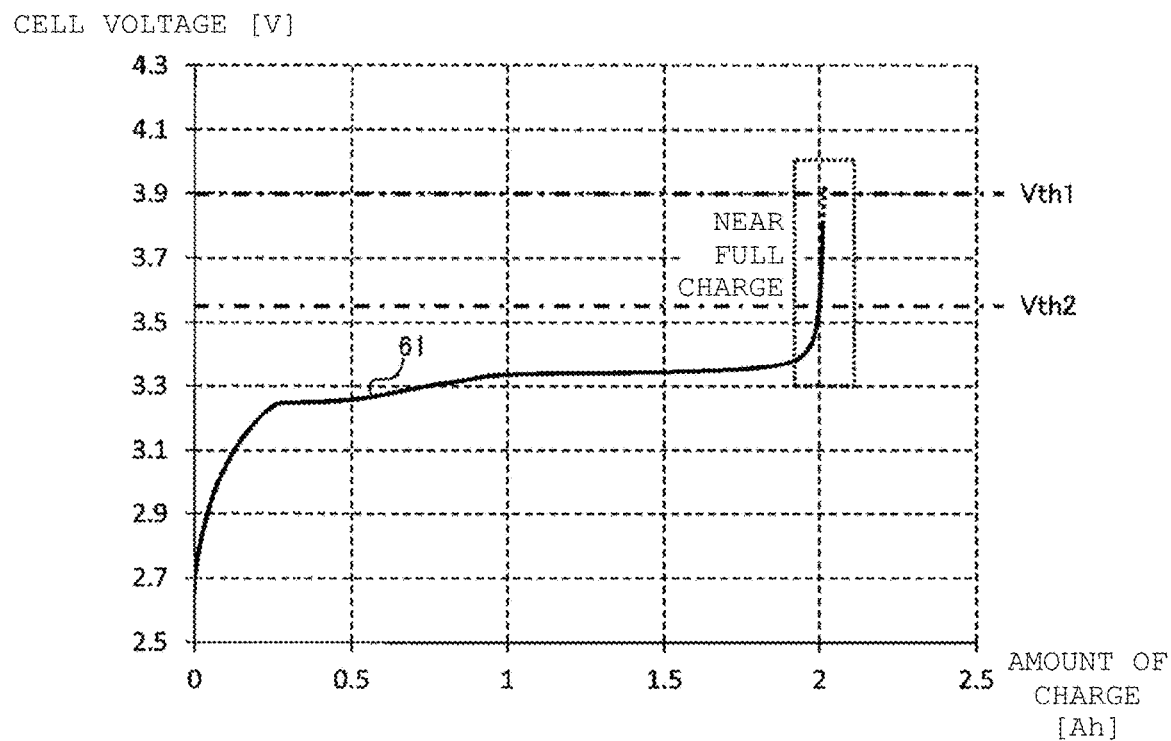
FIG. 3 is a graph illustrating charge voltage characteristics of a battery cell in a battery pack.

FIG. 3 is a graph illustrating typical charge voltage characteristics of the battery cells 11 to 14. In FIG. 3, the vertical axis indicates cell voltage [V], and the horizontal axis indicates charge amount, that is, charged capacitance [Ah]. FIG. 3 illustrates a characteristic curve 61 in a case where an LFP-Gr cell having a fully charged capacitance 2 Ah (hereinafter sometimes abbreviated as the "cell") is used as the battery cells 11 to 14. The characteristic curve 61 shows the relationship between the cell charge amount and the cell voltage during cell charging.

In the LFP-Gr cell, as shown in FIG. 3, the cell voltage rises sharply near the full charge state (near 2 Ah). The characteristic curve 61 of the LFP-Gr cell has a portion where the gradient is flat in a region where the charge amount is smaller than the full charge state. When the charge amount increases from the full charge state, the characteristic curve 61 becomes steeper. For this reason, in the battery pack 1 of the present embodiment, it is important to appropriately guide the behavior at the end of charging.

FIG. 3 illustrates the first and second threshold values Vth1 and Vth2 in the battery pack 1 of the present embodiment. In the example of FIG. 3, the first threshold value Vth1 is set to 3.9 V, and the second threshold value Vth2 is set to 3.55 V. The characteristic curve 61 of the battery cell passes through the second threshold value Vth2 near the full charge, and reaches the first threshold value Vth1.

The first and second threshold values Vth1 and Vth2 are set such that the first threshold value Vth1 becomes greater than the second threshold value Vth2 near the full charge of the first and second battery cells 11, 12 to 14. The first threshold value Vth1 and the second threshold value Vth2 are set in consideration of a difference between the state of charge (SOC) of the first battery cell 11 and the SOC of the second battery cell 12. The method for setting the SOC difference will be described later.

2. Operation

The operation of the battery pack 1 configured as described above will be described below.

2-1. Balance Operation

When the battery pack 1 according to the present embodiment is charged from the charge circuit 20 (FIG. 1) and the like, the balance operation is performed by the balance circuit 3 functioning. The balance operation in the battery pack 1 of the present embodiment will be described with reference to FIG. 4.

Figure 4:
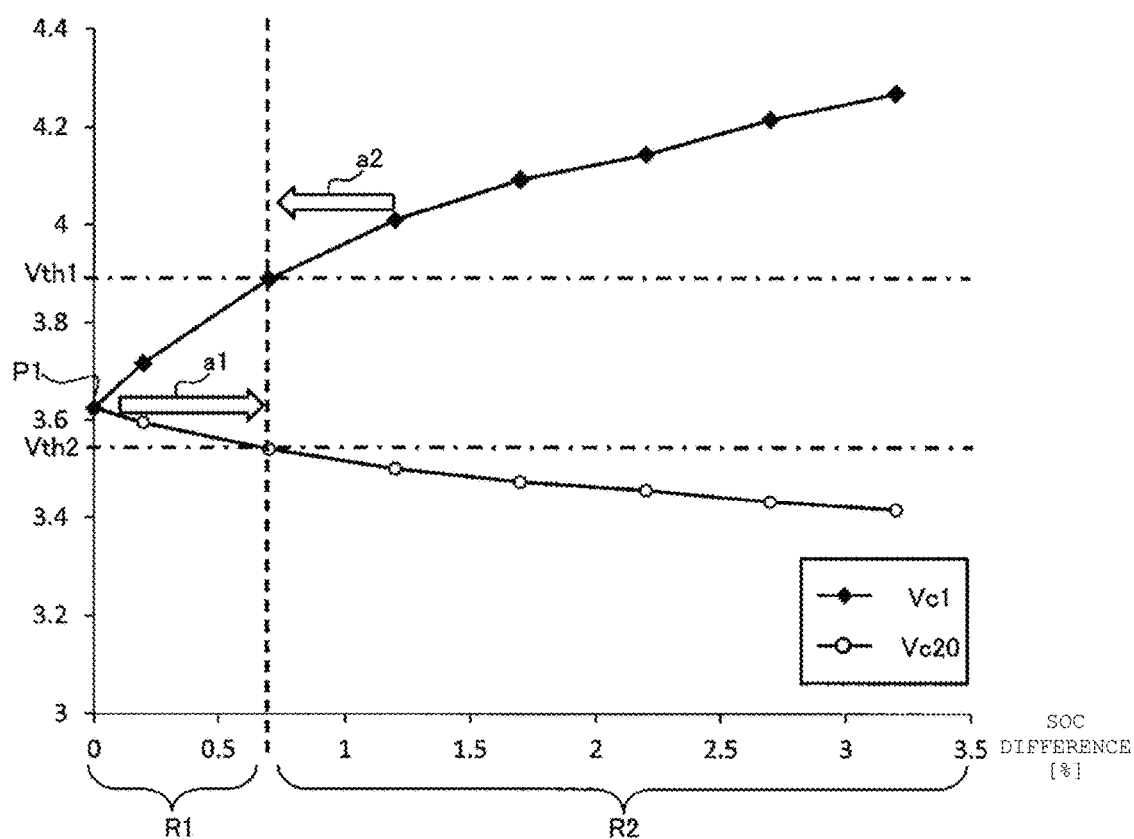
FIG. 4 is a graph for explaining a relationship between a balance operation of a battery pack and a SOC difference.

FIG. 4 is a graph for explaining a relationship between the balance operation of the battery pack 1 according to the present embodiment and the SOC difference. In FIG. 4, the vertical axis indicates cell voltage [V], and the horizontal axis indicates SOC difference [%]. Hereinafter, an operation example of the balance operation performed by the battery pack 1 when the charge circuit 20 performs the CV charging at the charge voltage 14.5 V will be described. In this operation example, it is assumed that the SOC difference of the battery pack 1 is 0% in the initial state.

In FIG. 4, in the case where the battery pack voltage Va (FIG. 1) is 14.5 V as an example of the end of charging, the cell voltage Vc1 of the first battery cell 11 and the average cell voltage Vc20 (=(Vc2+Vc3+Vc4)/3) of the second battery cells 12 to 14 are shown. When the battery pack voltage Va is constant, for example, when the cell voltage Vc1 of the first battery cell 11 increases, the cell voltage Vc20 of the second battery cells 12 to 14 decreases. Accordingly, as illustrated in FIG. 4, the SOC difference between the SOC of the first battery cell 11 and the SOC of the second battery cells 12 to 14 varies.

A point P1 in FIG. 4 shows a state where the SOC difference is 0%. In the state at the point P1, the cell voltages Vc1 and Vc20 are both 3.625 V (=14.5/4 V). Further, in the example of FIG. 4, the first threshold value Vth1 (=3.9 V) is greater than the voltage at the point P1. On the other hand, the second threshold value Vth2 (=3.55 V) is smaller than the voltage at the point P1.

In this operation example, the initial state of the battery pack 1 corresponds to the point P1 in FIG. 4. At the point P1, the cell voltage Vc1 of the first battery cell 11 is lower than the first threshold value Vth1, while the cell voltage Vc20 of the second battery cells 12 to 14 is greater than the second threshold value Vth2. For this reason, in the balance circuit 3 of the battery pack 1, the controller 32 is configured to generate control signals S1 to S4 to perform control to turn on the discharge circuits 30 of the second battery cells 12 to 14 while maintaining the discharge circuit 30 of the first battery cell 11 in the off state.

Then, the cell voltage Vc20 of the second battery cells 12 to 14 decreases due to the discharge, and at the same time, in the example of FIG. 4, the cell voltage Vc1 of the first battery cell 11 increases. Therefore, the SOC difference between the first battery cell 11 and the second battery cell 12 increases in a region R1 where the cell voltage Vc20 of the second battery cells 12 to 14 is greater than the second threshold value Vth2 from the point P1 of 0% in the initial state, as shown by an arrow a1 in FIG. 4.

When the SOC difference increases to reach a region R2 where the cell voltage Vc1 of the first battery cell 11 is greater than the first threshold value Vth1, the controller 32 of the battery pack 1 turns on the discharge circuit 30 of the first battery cell 11 according to the control signal S1. In the example of FIG. 4, in the region R2, the cell voltage Vc20 of the second battery cells 12 to 14 is equal to or less than the second threshold value Vth2. Therefore, the controller 32 turns off the discharge circuits 30 of the second battery cells 12 to 14 according to the control signals S2 to S4. Thus, the cell voltage Vc1 of the first battery cell 11 decreases due to the discharge, and at the same time, the cell voltage Vc20 of the second battery cells 12 to 14 increases. Therefore, in the region R2, the SOC difference decreases as indicated by an arrow a2.

By repeating the above operation, the SOC difference converges between the two regions R1 and R2. For example, the difference amount that converges the SOC difference can be set to, for example, around 0.7%. As described above, in the battery pack 1 of the present embodiment, the balance operation is performed so that the SOC difference is formed between the first and second battery cells 11, 12 to 14, and the SOC difference is maintained at a preset difference amount. Although the above description has been made using the average cell voltage Vc20 between the second battery cells 12 to 14 for the sake of convenience of description, the control of the discharge circuits 30 of the plurality of second battery cells 12 to 14 by the control portion 32 is performed individually based on the detection results of the cell voltages Vc2, Vc3, and Vc4 of the individual second battery cells 12 to 14.

2-1-1. Action of the Balance Operation

The action of the balance operation in the battery pack 1 of the present embodiment as described above will be described with reference to FIG. 5.

Figure 5:
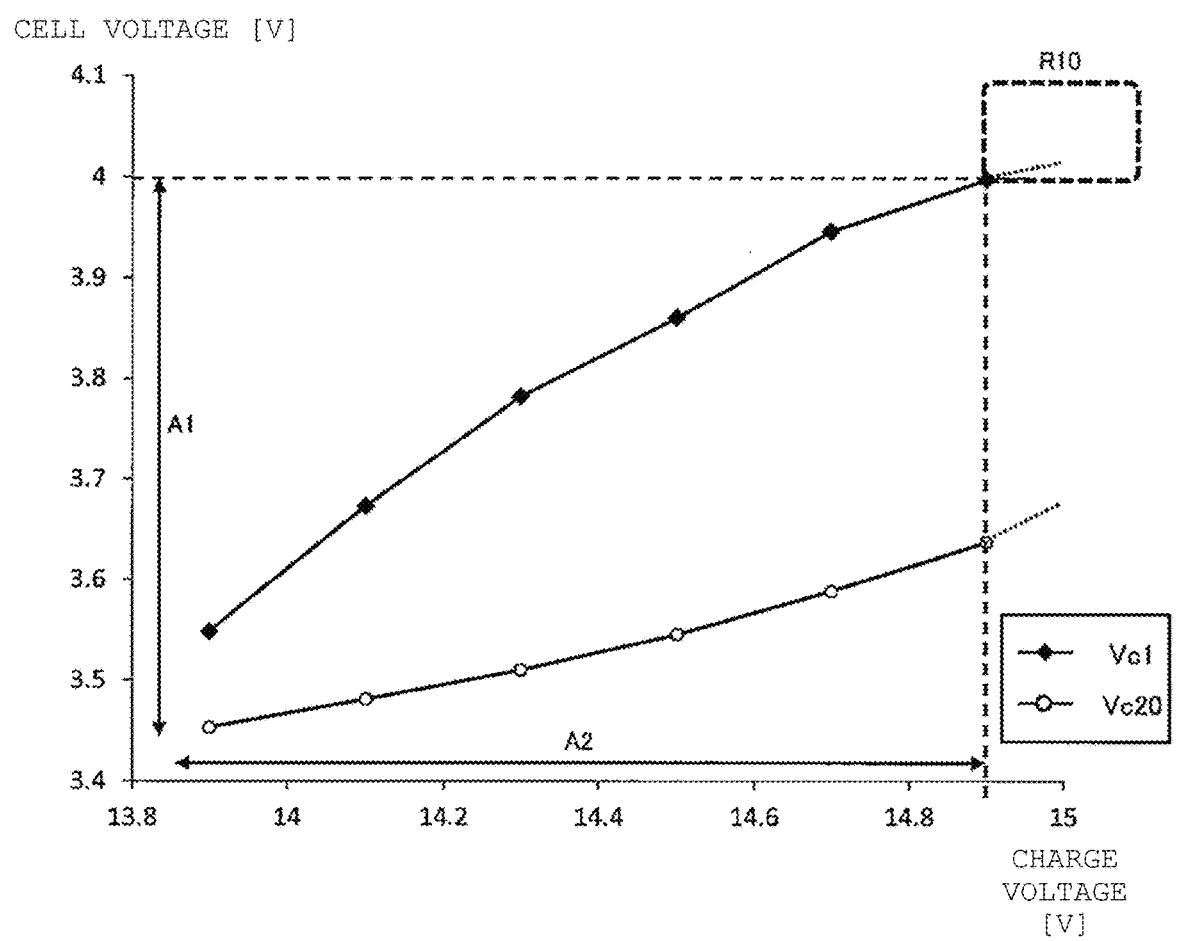
FIG. 5 is a graph for explaining an action of a balance operation of a battery pack.

FIG. 5 is a graph for explaining the action of the balance operation of the present embodiment. In FIG. 5, the vertical axis represents cell voltage [V], and the horizontal axis represents charge voltage [V].

In the graph of FIG. 5, cell voltages Vc1 and Vc20 in a case where charge voltage has various values with respect to the battery pack 1 in which the SOC difference between the first battery cell 11 and the second battery cells 12 to 14 is set to a predetermined difference amount are illustrated. The SOC difference amount is, for example, 0.5% to 0.7%.

FIG. 5 shows an abnormal region R10 in which the cell voltage and the charge voltage exceed the upper limits of respective normal ranges A1 and A2. The abnormal region R10 is set based on, for example, a safe use region of a battery based on the Electrical Appliances and Materials Safety Act, for example, and a normal use range defined based on various specs of the battery cells 11 to 14.

The normal range A1 of the cell voltage is a range of the cell voltages Vc1 to Vc4 in which the individual battery cells 11 to 14 can be normally hold without being overcharged. The normal range A1 is determined according to characteristics unique to the battery cells 11 to 14, such as the characteristic curve 61 (FIG. 3). FIG. 5 shows an example in which the upper limit value of the normal range A1 of the cell voltage is 4.0 V.

The normal range A2 of the charge voltage is a range in which a higher-level system including the charge circuit 20 (FIG. 1) can normally use the battery pack 1. In the example of FIG. 5, the upper limit value of the normal range A2 of the charge voltage is set to 14.9 V. Hereinafter, a charge voltage exceeding the upper limit value is regarded as abnormal.

In the battery pack 1 of the present embodiment, the SOC difference at the end of charging is maintained as in the example of FIG. 5 by the above-described balance operation. Here, when the charge voltage is within the normal range A2, the cell voltage Vc1 of the first battery cell 11 is maintained to be greater than the cell voltage Vc20 of the second battery cells 12 to 14 within the normal range A1 of the cell voltage. By the balance operation of the present embodiment, as shown in FIG. 5, when the charge voltage exceeds the upper limit value of the normal range A2, only the first battery cell 11 can reach the abnormal region R10 while the cell voltage Vc20 of the second battery cells 12 to 14 is maintained within the normal range A1.

As described above, with the battery pack 1 of the present embodiment, when an abnormal charge voltage outside the normal range A2 is applied to the battery pack 1 due to an abnormality of the higher-level system or the like, the cell voltage Vc1 of the first battery cell 11 can be guided to the abnormal region R10 such that the battery pack 1 becomes unusable. At this time, the cell voltage Vc20 of the second battery cells 12 to 14 is maintained in the normal range A2 to avoid a situation in which the first battery cell 11 and the second battery cells 12 to 14 are simultaneously overcharged, such that the battery pack 1 can fail relatively safely. Moreover, a structural change that can occur in the battery pack 1 can be made smaller than in the case where all the battery cells 11 to 14 expand. As described above, the safety during charging of the battery pack 1 can be improved.

2-2. Regarding Setting of SOC Difference

The difference amount of the SOC difference and the corresponding threshold values Vth1 and Vth2 of the battery pack 1 described above can be appropriately set in consideration of the normal ranges A1 and A2, the abnormal region R10, and the like described above. A method for setting the SOC difference in the battery pack 1 will be described with reference to FIG. 6.

Figure 6:
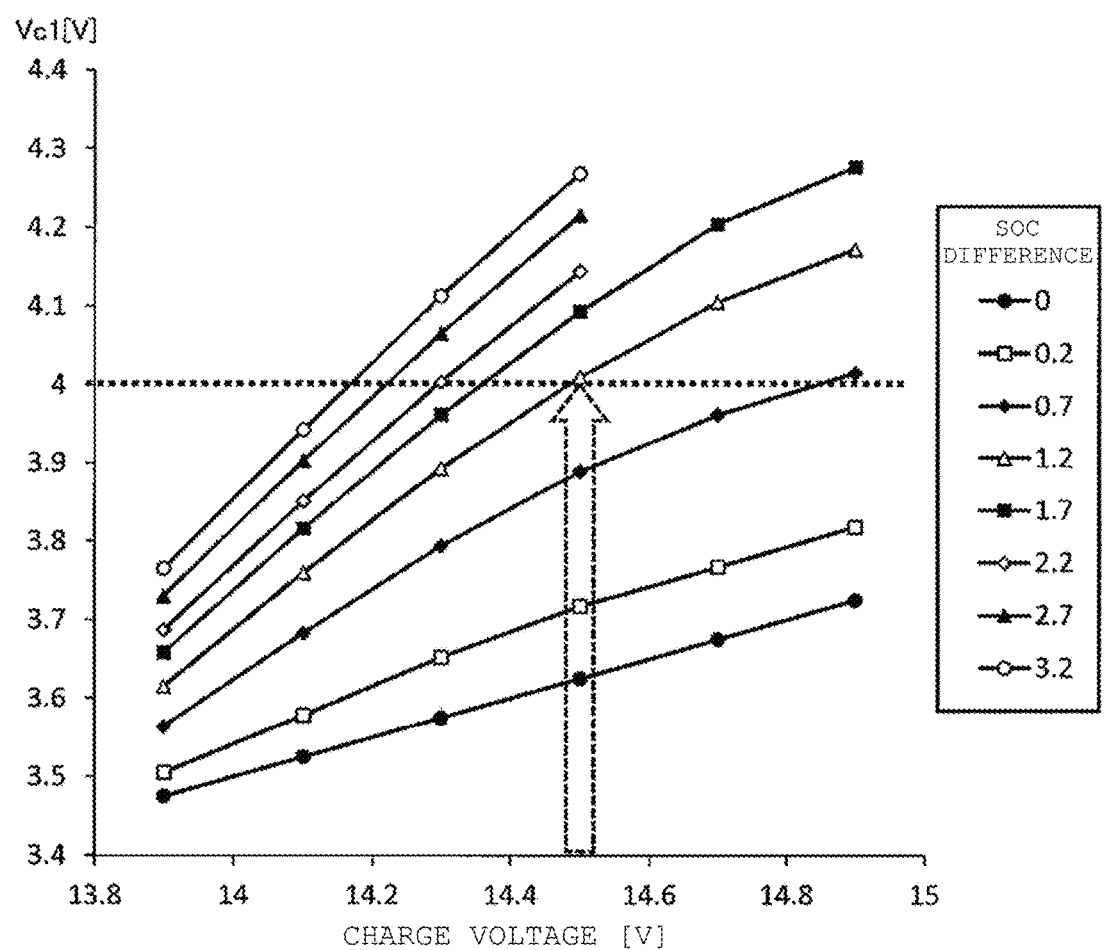
FIG. 6 is a graph for explaining a method of setting an SOC difference in a battery pack.

FIG. 6 is a graph for explaining a method of setting the SOC difference in the battery pack 1. In FIG. 6, the vertical axis indicates cell voltage [V] of the first battery cell 11, and the horizontal axis indicates charge voltage [V].

In FIG. 6, for the battery pack 1 in which four LFP-Gr cells are connected in series, the cell voltage Vc1 of the first battery cell 11 in the case where the SOC differences with respect to the second battery cells 12 to 14 are 0%, 0.2%, 0.7%, 1.2%, 1.7%, 2.2%, 2.7%, and 3.2% is illustrated.

The appropriate difference amount of the SOC is preferable set such that, at the upper limit (for example, 14.9 V) of the normal range A2 of the specified charge voltage, the cell voltage Vc1 of the first battery cell 11 for which the SOC is set to be higher do not exceed the upper limit (for example 4.0 V) of the normal range A1 where the safe use is possible. The difference amount may be changed as appropriate within a range allowed by various specs and operating environments.

For example, a case where, for the battery pack 1 in which four LFP-Gr cells are connected in series, Vth1=4 V is set for one first battery cell 11 with respect to an upper limit value 14.9 V of a specified charge voltage and an upper limit value 4 V of cell voltage is assumed (FIG. 6).

In this case, for the remaining three second battery cells 12 to 14, the amount of difference of the SOC passing the point where the cell voltage is 4 V at the charge voltage 14.9 V as shown in FIG. 6 is determined. Here, the state where the SOC difference amount is in a 0.7% state is selected.

Next, the cell voltage Vc1 at the specified charge voltage (here, 14.5 V) is determined in the state where the selected SOC difference amount is 0.7%. FIG. 6 shows that the cell voltage Vc1 is determined to be approximately 3.9 V. In this case, for example, Vth2=3.55 V (~3.53 V) is set for the remaining three second battery cells 12 to 14 according to (14.5−3.9)/3~3.53.

As a result, the cell voltages Vc1 to Vc4 of the four battery cells 11 to 14 in the battery pack 1 become Vc1~3.9 V and Vc2, Vc3, Vc4~3.55 V, respectively, during the balance operation with respect to the specified charge voltage. Further, when the charge voltage reaches the upper limit of the normal range A2, the state where Vc1~4 V and Vc2, Vc3, Vc4~3.63 V is maintained.

As the SOC difference amount and the threshold values Vth1 and Vth2, necessary values can be appropriately set according to an assumed charge voltage and the like. For example, the upper limit value of the SOC difference amount may be 5%. Further, the lower limit value of the difference amount may be 0.3%. Similarly, the difference between the first and second threshold values Vth1 and Vth2 may be 0.3 V or more and 0.9 V or less.

As a method of creating the difference state of the battery pack 1 according to the difference amount of the SOC as described above, for example, there is a method of combining battery cells having different capacitances. For example, for the battery pack 1 including four single cells in series, first, battery cells are selected such that capacitance of each of three battery cells is 99.3% and the capacitance of one battery cell is 99.3 to 100. Next, each of the selected battery cells is discharged to the lower limit voltage (SOC=0%) (or thereafter, for example, a predetermined amount such as 30% with respect to the above-mentioned capacitance 100% is charged), and the four battery cells are connected in series.

It should be appreciated that the method of creating the difference state is not limited to the above method, but a combination in which the capacitance varies between the battery cells may be performed. For example, for a battery pack including four single cells in series, the four battery cells are fully charged, then three battery cells are discharged by the specified capacitance, and the remaining one battery cell is discharged for the difference amount of capacitance smaller than the specified capacitance. After that, the four battery cells are connected in series.

3. Summary

As described above, the battery pack 1 according to the present embodiment is the rechargeable battery pack 1. The battery pack 1 includes the plurality of battery cells 11 to 14, the detection portion 31, the plurality of discharge circuits 30, and the controller 32. The plurality of battery cells 11 to 14 are connected to each other in series. The detection portion 31 detects the cell voltages Vc1 to Vc4 between both ends of the respective battery cells 11 to 14. The plurality of discharge circuits 30 respectively discharge the battery cells 11 to 14. The controller 32 controls the discharge circuits 30 based on the cell voltages detected by the detection portion 31. Moreover, the controller 32 controls the discharge circuit 30 such that the first battery cell 11 is not discharged until the cell voltage Vc1 equal to or greater than the predetermined first threshold value Vth1 is detected in at least one first battery cell 11 of the plurality of battery cells 11 to 14. The controller 32 controls the discharge circuit 30 such that the second battery cells are discharged when a cell voltage equal to or greater than the second threshold value Vth2 that is smaller than the first threshold value Vth1 is detected in the second battery cells 12 to 14 other than the first battery cell 11 of the plurality of battery cells 11 to 14.

With the battery pack 1 described above, when an abnormal charge voltage is applied to the battery pack 1, only the first battery cell 11 is led to overcharging while the cell voltages Vc2 to Vc4 of the second battery cells 12 to 14 are maintained within the normal range A1. Thus, it is possible to avoid a situation in which all the battery cells 11 to 14 are overcharged simultaneously, and to improve safety when the battery pack 1 is charged.

In the present embodiment, when a cell voltage equal to or greater than the first threshold value Vth1 is detected in the first battery cell 11, the controller 32 discharges the first battery cell 11. As a result, the SOC difference between the first and second battery cells 11 is prevented from becoming excessive, and the safety of the battery pack 1 can be improved.

Moreover, in the present embodiment, the first threshold value Vth1 is set to be greater than the second threshold value Vth2 by the predetermined difference amount of state of charge between the first and second battery cells 11 and 12 to 14. As a result, the balance operation of the balance state differentiated for the different amount is performed in the battery pack 1. The first battery cell 11 and the second battery cells 12 to 14 may have common charge voltage characteristics (see FIG. 3). The first threshold value Vth1 is greater than the second threshold value Vth2 by, for example, a predetermined SOC difference amount in the charge voltage characteristics.

Further, in the present embodiment, the first battery cell 11 may have a larger capacitance than the capacitance of the second battery cells 12 to 14 by a predetermined difference amount of state of charge. The charge voltage characteristics of the first battery cells 11 may be set so as to be differentiated from the charge voltage characteristics of the second battery cells 12 to 14 within a predetermined allowable range.

In the present embodiment, the battery pack 1 further includes the battery protection circuit 10. The battery protection circuit 10 is an example of a protection circuit configured to stop charging of the battery pack 1 when cell voltages Vc1 to Vc4 that are equal to or greater than a predetermined threshold value (e.g., a third threshold) greater than the first threshold value Vth1 in the plurality of battery cells 11 to 14. The battery protection circuit 10 protects the battery pack 1 when each of the battery cells 11 to 14 is overcharged, and can improve the safety of the battery pack 1.

Moreover, in the present embodiment, the number of the plurality of battery cells 11 to 14 is, for example, four. However, it should be appreciated that the number of battery cells in the battery pack 1 is not limited to four, but may be five or more, or may be two or three. Battery cells in the battery pack 1 may be connected in series with each other, or may include a set connected in parallel.

Moreover, in the present embodiment, the number of the first battery cells 11 is, for example, one. However, the number of the first battery cells 11 in the battery pack 1 is not limited to one, but may be two. Further, the number of the first battery cells 11 may be one or more and less than half the number of the plurality of battery cells in the battery pack 1. Also in this case, when the charge voltage is abnormal, only the first battery cell can be led to the abnormal region R10 while a majority or more number of the second battery cell of the plurality of battery cells in the battery pack 1 is maintained in the normal range A1, and the safety of the battery pack 1 can be improved.

Moreover, in the present embodiment, the discharge circuit 30 includes a series circuit of the discharge resistance 33 and the switch 34, and is connected in parallel to each of the battery cells 11 to 14. With the discharge circuit 30, the balance operation of the battery pack 1 can be executed by the on/off control of the switch 34.

Moreover, in the present embodiment, the battery cells 11 to 14 are lithium ion batteries including a positive electrode including LFP and a negative electrode including Gr. With respect to the charge voltage characteristics of such LFP-Gr cell (FIG. 3), the safety of the battery pack 1 can be improved.

Additional Exemplary Embodiment

In the above embodiments, the example in which the battery cells 11 to 14 are LFP-Gr cells has been described. However, the battery cells of the battery pack are not limited to the LFP-Gr cells, but may include various lithium ion batteries such as olivine-based lithium ion batteries and non-olivine-based lithium ion batteries.

Further, in each of the above exemplary embodiments, the battery pack 1 including the battery protection circuit has been described, but the battery pack may be provided separately from the battery protection circuit.

The above exemplary embodiments are illustrative, and the present invention is not limited to the above embodiments.

DESCRIPTION OF REFERENCE SYMBOLS

1: Battery pack
10: Battery protection circuit portion
11: First battery cell
12 to 14: Second battery cell
30: Discharge circuit
31: Detection portion
32: Control portion
33: Discharge resistance
34: Switch

The invention claimed is:

1. A rechargeable battery pack, comprising:
a plurality of battery cells connected in series to each other;
a detection portion configured to detect a cell voltage between both ends of each of the plurality of battery cells;
a plurality of discharge circuits configured to discharge each respective battery cell; and
a controller configured to:
compare the cell voltage of at least one first battery cell of the plurality of battery cells only to a predetermined first threshold voltage value,
compare the cell voltage of the at least one second battery cell only to a predetermined second threshold voltage value that is smaller than the first threshold voltage value, the at least one second battery cell being a remaining portion of the plurality of battery cells other than the at least one first battery cell,
control the discharge circuit to discharge the at least one first battery cell when the at least one first battery cell has a cell voltage that is equal to or greater than the predetermined first threshold voltage value, and
control the discharge circuit to discharge the at least one second battery cell when the at least one second battery cell has a cell voltage that is equal to or greater than the second threshold voltage value.

2. The battery pack according to claim 1, wherein the at least one second battery cell is a different battery cell than the at least one first battery cell of the plurality of battery cells.

3. The battery pack according to claim 1, wherein the first threshold voltage value is set to be greater than the second threshold voltage value by a predetermined difference amount of a state of charge between the at least one first battery cell and the at least one second battery cell.

4. The battery pack according to claim 1, further comprising a protection circuit configured to stop a charging operation of the battery pack when the detection portion detects a cell voltage that is equal to or greater than a third threshold voltage value that is greater than the first threshold voltage value in the plurality of battery cells.

5. The battery pack according to claim 1, wherein the at least one first battery cell comprises one or more first battery cells and half or less of a total number of the plurality of battery cells.

6. The battery pack according to claim 5, wherein the total number of the plurality of battery cells is four or more.

7. The battery pack according to claim 1, wherein the plurality of discharge circuits includes a series circuit of discharge resistances and switches that are respectively coupled in parallel to each of the plurality of battery cells.

8. The battery pack according to claim 1, wherein each of the plurality of battery cells is a lithium ion battery that includes a positive electrode containing lithium iron phosphate and a negative electrode containing graphite.

9. The battery pack according to claim 1, further comprising a charge circuit that includes a generator and a converter, and that is configured to execute a charge operation for charging the battery pack when a detected battery pack voltage is less than a predetermined value.

10. A rechargeable battery pack, comprising:
a plurality of battery cells connected in series to each other;
a detection portion configured to detect a cell voltage between both ends of each of the plurality of battery cells;
a plurality of discharge circuits configured to discharge each respective battery cell; and
a controller configured to:
control the discharge circuit based on the detected cell voltage,
control the discharge circuit to discharge at least one first battery cell of the plurality of battery cells when the at least one first battery cell has a cell voltage that is equal to or greater than a predetermined first threshold voltage value, and to discharge at least one second battery cell of the plurality of battery cells when the at least one second battery cell has a cell voltage that is equal to or greater than a second threshold voltage value that is smaller than the first threshold voltage value, the at least one second battery cell being a remaining portion of the plurality of battery cells other than the at least one first battery cell, and
perform a balance operation of the plurality of battery cells, such that a state of charge difference between the at least one first battery cell and the at least one second battery cell is maintained to be at least a predetermined amount of difference.

11. The battery pack according to claim 10,
wherein the at least one second battery cell comprises a plurality of second battery cells, and
wherein the controller is configured to perform the balance operation while maintaining a uniformity of each cell voltage of the plurality of second battery cells.

12. The battery pack according to claim 1, wherein the detection portion includes a voltage measurement circuit configured to detect the cell voltage between both ends of each of the plurality of battery cells.

13. The battery pack according to claim 1, wherein the controller includes a logic circuit and a comparator configured to compare the cell voltage of the at least one first battery cell to the predetermined first threshold voltage value and to compare the cell voltage of the at least one second battery cell to the predetermined second threshold voltage value.

14. The battery pack according to claim 1, wherein the controller is configured to turn off the plurality of discharge circuit when the at least one first battery cell has a cell voltage that is less than the predetermined first threshold voltage value.

15. A rechargeable battery pack, comprising:
a plurality of battery cells connected in series;
a voltage measurement circuit configured to detect a cell voltage of each of the plurality of battery cells;
a plurality of discharge circuits configured to discharge the plurality of battery cells, respectively; and
a control circuit configured to:
compare the detected cell voltage of a first battery cell of the plurality of battery cells only to a predetermined first threshold voltage value,
compare the detected cell voltage of a second battery cell of the plurality of battery cells only to a predetermined second threshold voltage value that is smaller than the first threshold voltage value, the second battery cell being a remaining portion of the plurality of battery cells other than the first battery cell,
control the plurality of discharge circuits to discharge the first battery cell when the detected cell voltage of the first battery cell is equal to or greater than the predetermined first threshold voltage value, and to discharge the second battery cell when the detected cell voltage of the second battery cell is equal to or greater than the second threshold voltage value.

16. The battery pack according to claim 15, wherein the controller is configured to perform a balance operation of the plurality of battery cells, such that a state of charge difference between the first battery cell and the second battery cell is maintained to be at least a predetermined amount of difference.

17. The battery pack according to claim 15, wherein the first threshold voltage value is set to be greater than the second threshold voltage value by a predetermined difference amount of a state of charge between the first battery cell and the second battery cell.

18. The battery pack according to claim 15, further comprising a protection circuit configured to stop a charging operation of the battery pack when the voltage measurement circuit detects a cell voltage of one of the plurality of battery cells that is equal to or greater than a third threshold voltage value that is greater than the first threshold voltage value.

19. The battery pack according to claim 15,
wherein the first battery cell comprises one or more first battery cells and half or less of a total number of the plurality of battery cells, and
wherein the total number of the plurality of battery cells is four or more.

20. The battery pack according to claim 15, wherein the plurality of discharge circuits includes a series circuit of discharge resistances and switches that are respectively coupled in parallel to each of the plurality of battery cells.

* * * * *